United States Patent
Patel et al.

[11] Patent Number: 6,075,512
[45] Date of Patent: *Jun. 13, 2000

[54] TEMPERATURE COMPENSATION OF A WEDGE-SHAPED LIQUID-CRYSTAL CELL

[75] Inventors: Jayantilal Patel, State College, Pa.; Jung-Chih Chiao, Honolulu, Hi.

[73] Assignee: Tellium, Inc., Oceanport, N.J.

[*] Notice: This patent is subject to a terminal disclaimer.

[21] Appl. No.: 08/891,093

[22] Filed: Jul. 10, 1997

Related U.S. Application Data

[60] Provisional application No. 60/037,216, Feb. 6, 1997.

[51] Int. Cl.⁷ .................................................. G09G 3/36
[52] U.S. Cl. .............................. 345/101; 345/97; 349/72; 349/142
[58] Field of Search ................................ 345/101, 97, 50; 349/72, 142, 141

[56] References Cited

U.S. PATENT DOCUMENTS

| | | |
|---|---|---|
| 4,840,461 | 6/1989 | Winter et al. . |
| 4,952,032 | 8/1990 | Inoue et al. ............................... 345/97 |
| 5,113,275 | 5/1992 | Patel et al. . |
| 5,615,029 | 3/1997 | Moddel et al. . |
| 5,841,500 | 11/1998 | Patel ........................................ 349/141 |

FOREIGN PATENT DOCUMENTS

2 163 864  5/1986  United Kingdom .

*Primary Examiner*—Steven J. Saras
*Assistant Examiner*—Alecia D. Nelson
*Attorney, Agent, or Firm*—Morgan, Lewis & Bockius LLP

[57] ABSTRACT

A method and apparatus for compensating for temporally varying effects, such as temperature, in a liquid-crystal cell, particularly a wedge-shaped liquid-crystal cell. The temperature of the liquid crystal is measured, either directly with a thermocouple or the like, or by optical means which depend upon the temperature of the liquid crystal. For example, an intensity detector monitors the polarization rotation of a probe beam of light having a substantially different wavelength than that of the beam modulated by the liquid crystal, and a feedback circuit keeps the intensity at a predetermined value corresponding to the optimum path length in the liquid crystal of the modulated beam. The feedback signal from the temperature measurement is used to effectively change the gap filled with liquid crystal. For a wedge-shaped cell, the gap size is changed by moving the cell in the wedge direction. Other cell structures are available in which the gap size is physically changed by mechanical movement of the cell walls.

14 Claims, 7 Drawing Sheets

TEMPERATURE

TEMPERATURE COMPENSATION OF A WEDGE-SHAPED LIQUID-CRYSTAL CELL

RELATED APPLICATION

This application claims benefit of U.S. Provisional Application Ser. No. 60/037,216 entitled Temperature Compensation and filed Feb. 6, 1997 in the name of Jung-Chih Chiao.

FIELD OF THE INVENTION

The invention generally relates to liquid-crystal optical devices. In particular, the invention relates to the temperature compensation of such devices.

BACKGROUND ART

Liquid-crystal modulators are well known. They are most prevalently used in displays ranging in size from wrist watches to flat-panel displays on lap top computers. In such displays, the bias applied to the pixel of the multi-element cell, when used in combination with polarizers, determines whether the pixel absorbs or passes light. Since the output is directly viewed, the ratio of the light passed in the transmissive mode to the light passed in the absorptive mode need not be very high for the contrast between the two states to be readily discernible. This ratio of intensities or similar characteristics is referred to as the extinction ratio for a liquid-crystal cell.

Specialized liquid-crystal optical modulators are also known in which a single, well defined beam strikes the modulator and its intensity is modulated according to the electrical bias applied across the liquid-crystal cell. Many applications of optical modulators require a high extinction ratio.

A relatively new application of liquid crystals involves optical switches in a multi-wavelength optical communication, as is disclosed by Patel et al. in U.S. Pat. No. 5,414,540. In U.S. patent application Ser. No. 08/780,925 entitled Wedge-Shaped Liquid-Crystal Cell, filed Jan. 9, 1997 in the name of Jayantilal Patel, incorporated herein by reference in its entirety. Patel briefly introduces this type of liquid-crystal switch and further explains the necessity for precisely defining the gap in the liquid-crystal cell used in such a device. The liquid crystal is filled into the gap, and electrodes on opposing sides of the gap are selectively biased to control the optical polarization converting characteristics of the cell.

It is well known that the transmissivity I of light through parallel polarizers sandwiching a 90° twisted nematic liquid crystal follows a dependence $$I = \frac{\sin^2\left(\frac{\pi}{2}\sqrt{1+u^2}\right)}{1+u^2}, \quad (1)$$

where $$u = \frac{2d \cdot \Delta n}{\lambda}, \quad (2)$$

where d is the effective thickness of liquid-crystal, $\Delta n$ is the birefringence, that is, the difference between the extraordinary and ordinary refractive indices $n_e$, $n_o$, and $\lambda$ is the free-space wavelength of the light with the previously defined quantities. The nematic liquid crystal is twisted by 90° when no electrical bias is applied across the cell. The transmissivity when a strong electrical bias is applied across the cell is equal to unity when the parallel-polarizer transmissivity I is defined as in Equation (1). The ratio of the biased transmissivity to the parallel-polarizer transmissivity I is often called the extinction coefficient although there is some ambiguity in the usage of the latter term. For the high value of extinction coefficient required for high-performance modulator, the parallel-polarizer transmissivity I needs to be minimized, and it depends upon the thickness d with the dependence defined in Equation (1). Although the transmissivity I is relatively small for values of u greater than 1, it assumes a zero (minimum) value only for a discrete set of parameters dependent upon the positive even integers $$\sqrt{1+u^2} = 2, 4, 6, \ldots, \quad (3)$$

which can be alternately expressed as $$u = 1.732, 3.873, 5.916, \quad (4)$$

The values stated in either Equation (3) or (4) are known as the first, second, and third minimum conditions respectively and represent conditions for which exact polarization conversion occurs.

Thus, only for discrete values of cell thickness d does the extinction coefficient assume theoretically infinite value.

Figure 1:
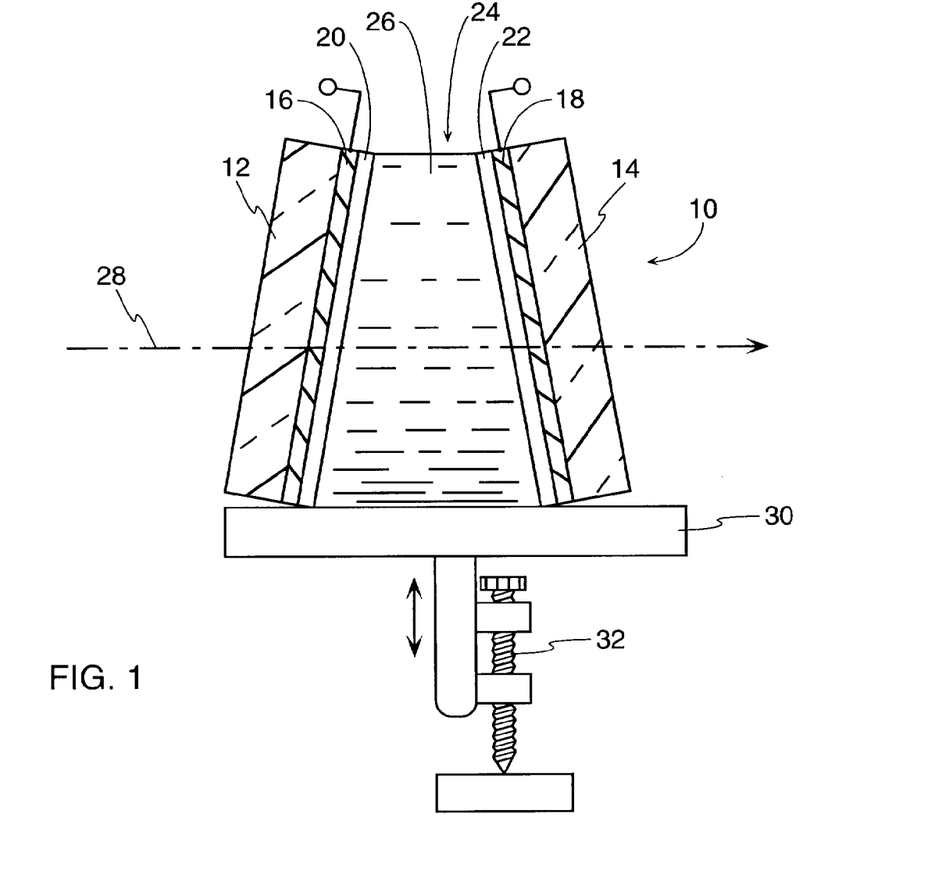
FIG. 1 is cross-sectional view of a wedge-shaped liquid-crystal cell.

Patel discloses that the gap size can be precisely controlled in a wedge-shaped liquid-crystal cell 10 illustrated in partial cross section in FIG. 1. The cell 10 includes two assemblies of respective glass substrates 12, 14 coated with respective electrodes 16, 18 and alignment layers 20, 22, as is common for most liquid-crystal devices. However, when the two assemblies are assembled together with a gap 24 therebetween, two different sizes of spacers are used so that gap 24 assumes the shape of a wedge, that is, of varying gap from the top to the bottom. A typical variation in the size of the gap 24 is between 6 and 8 μm for the infrared optical switches contemplated by Patel. The angle of the wedge is exaggerated in FIG. 1. A nematic liquid crystal 26 is filled into the so defined wedge-shaped gap 24.

This wedge-shaped liquid-crystal cell 10 is usable with an optical beam 28 having a vertical dimension small compared to the size of the cell 10 along the wedge direction. The cell 10 is supported on a vertically movable support 30, and an adjustment means 32 vertically moves the support 30 and hence the wedge-shaped liquid-crystal cell 10 up or down until the beam 28 strikes the cell 10 at a position having an optimally sized gap. The optimal size can be determined by several optical means, as is explained in the parent application.

The wedge-shaped liquid-crystal cell allows the operational gap to be established to accuracies virtually unobtainable in planar cells because manufacturing introduces variations in thickness much larger than the required accuracy in gap thickness.

It has long been known that the performance of liquid-crystal devices is affected by temperature. Patel has described one electronic compensation scheme in U.S. Pat. No. 5,113,275 for compensating a liquid-crystal filter by adjusting the biasing voltage. Others have been described in U.S. Pat. No. 3,921,162 to Fukai et al., U.S. Pat. No. 4,128,311 to Smith et al., U.S. Pat. No. 4,460,247 to Hilsum et al., U.S. Pat. No. 4,625,163 to Germer, and U.S. Pat. No. 4,834,504 to Garner. All these schemes have disadvantages and do not take advantage of the unique geometry in a wedge-shaped liquid-crystal cell.

Figure 2:
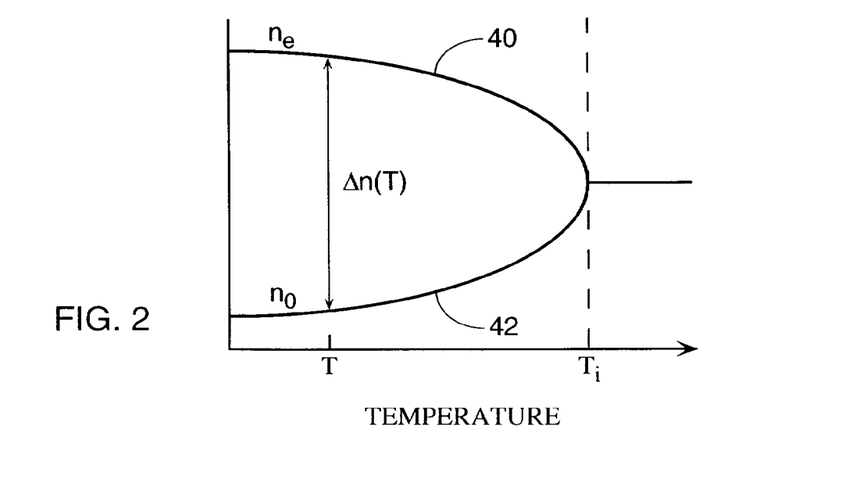
FIG. 2 is a graph of the temperature dependence of the refractive index of a typical nematic liquid crystal.

Temperature variations in a liquid-crystal cell can arise from a number of sources. However, it believed that thermal expansion of mechanical parts, which would affect the gap size d produces a much smaller effect than do thermal effects upon the liquid crystal itself. It is known that the refractive index of nematic liquid crystals generally follows the dependence shown in FIG. 2. Above an isotropic transition temperature $T_i$, also known as the clearing temperature, the refractive index is isotropic and the useful nematic qualities are absent. Below the clearing temperature $T_i$, the refractive index is represented by an upper curve 40 for extraordinarily polarized light, that is, $n_e$, and by a lower curve 42 for ordinarily polarized light, that is, $n_o$. The difference between the two refractive indices 40, 42 is the refractive index difference or birefringence $\Delta n$ appearing in Equation (2). As was stated before, the value of the parameter u, which depends upon $\Delta n$, needs to be precisely controlled for zero transmissivity I. The temperature dependence of FIG. 2 shows that the refractive index difference is dependent upon the operating temperature. That is, the birefringence should be represented as $\Delta n(T')$. The two curves 40, 42 approach each other with increasing slope as the temperature approaches the clearing temperature $T_i$ with the result that the temperature dependence of the birefringence $\Delta n$ becomes very high just below the clearing temperature $T_i$. On the other hand, the temperature dependence becomes increasingly smaller further below the clearing temperature $T_i$.

These effects suggest that the temperature effects can be minimized by choosing a liquid crystal having a clearing temperature $T_i$ far above the operating temperature T'. For high-speed liquid-crystal cells, however, this relationship introduces the disadvantage that the viscosity will be correspondingly increased at temperatures far below the clearing temperature. Nonetheless, for the filters and switches contemplated by Patel, switching speed is not a major consideration for the expected millisecond switching times so a high clearing temperature $T_i$ is preferred.

Nonetheless, even a reduced temperature dependence is considered excessive for the very high extinction ratios required in multi-wavelength switches. It is greatly desired to remove all temperature dependence in the transmissivity I.

Active temperature control of the liquid-crystal device would eliminate the temperature dependence exhibited in FIG. 2. However, it is estimated that the cell would need to be regulated to temperature variations of less ±0.5° C. Although such close regulation is possible, the equipment it requires is expensive, bulky, and not appropriate for a fielded operation, and it further introduces problems such as condensation when the ambient temperature and moisture are significantly varying.

SUMMARY OF THE INVENTION

A liquid-crystal optical system that is compensated for thermal variations in the liquid crystal. The temperature of the liquid crystal is monitored by direct or indirect methods to produce a feedback signal that is used to physically change the path length through the liquid crystal of the light being polarization modulated by the liquid crystal. For a wedge-shaped liquid-crystal cell, the beam path length is effected by relatively moving the cell and the beam along the direction of the wedge.

DETAILED DESCRIPTION OF THE PREFERRED EMBODIMENTS

The invention exploits the fact that thermal variations in the refractive index difference or birefringence $\Delta n$ can be compensated by a controlled change in the effective cell thickness d. Referring back to Equation (2), the parameter u, the only variable in Equation (1), is proportional to the product $d \cdot \Delta n$ so a thermally induced increase (decrease) in $\Delta n$ can be compensated by a decrease (increase) in d. In a wedge-shaped cell, the effective thickness d can be changed by a simple translation of the cell along the direction of the wedge.

Figure 3:
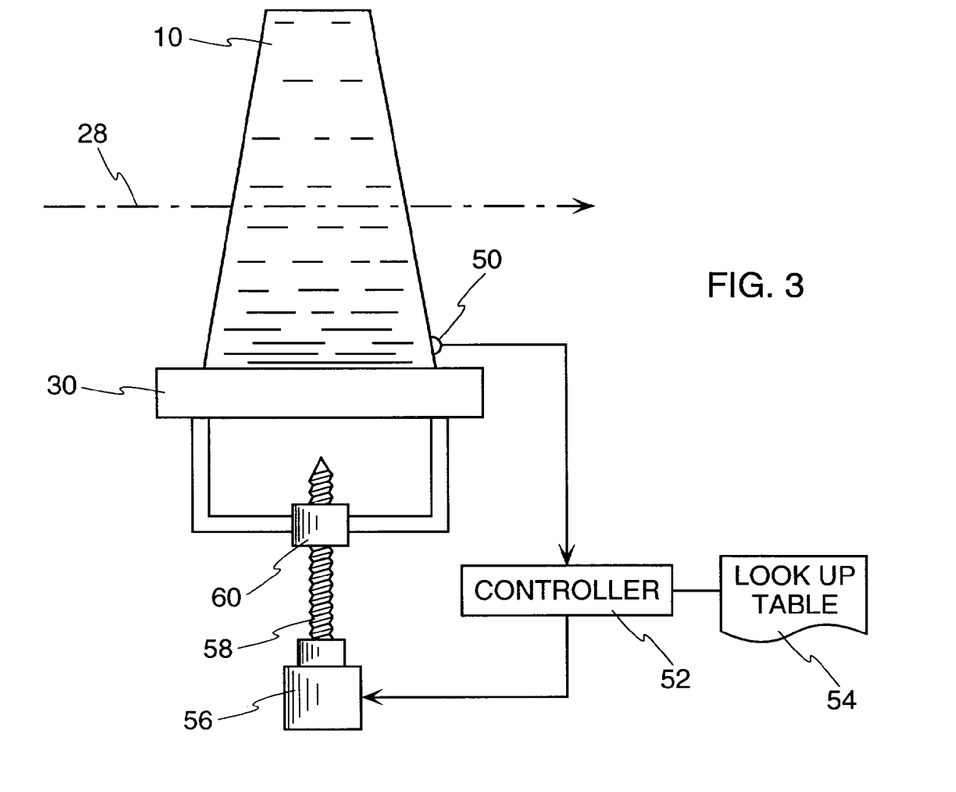
FIG. 3 is schematic representation of a temperature-sensing embodiment of a temperature-compensating liquid-crystal system.
Figure 4:
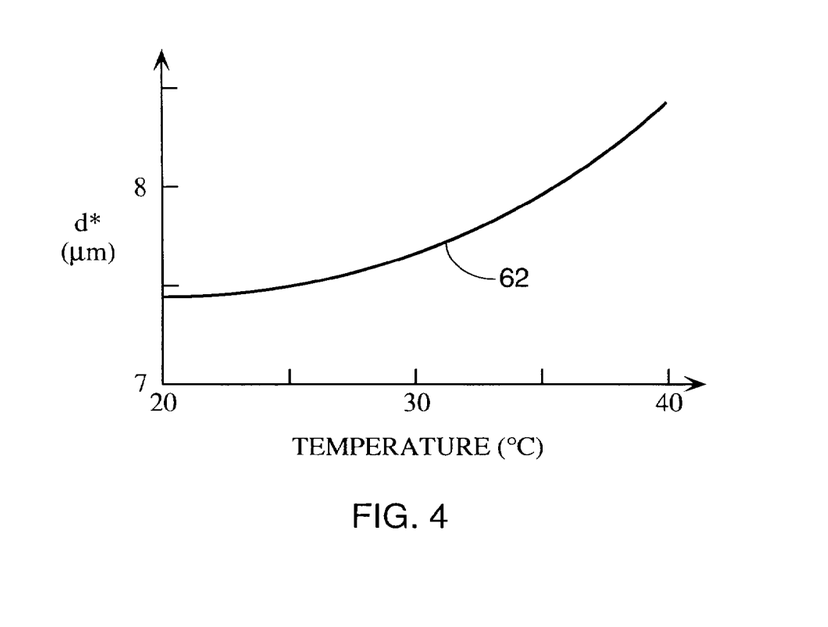
FIG. 4 is a graph of the dependence of the optimum cell gap size upon temperature.

A thermometric embodiment for temperature compensation of a wedge-shaped liquid-crystal cell, as illustrated in the schematic view of FIG. 3, includes an electronic temperature sensor 50, such as a thermocouple or varistor thermally contacted to the wedge-shaped cell 10. More than one temperature sensor can be placed at different positions of the cell if thermal gradients are expected. The output of the temperature sensor 50 is monitored by a control circuit 52, such as a microprocessor or other logic circuitry. A look-up table 54 contains optimum vertical positions for the liquid-crystal cell 10 as a function of its temperature. The look-up table 54 could be implemented as non-volatile memory with locations storing positions accessed by an address determined by temperature. Plot 62 in FIG. 4 shows the dependence of the optimum cell thickness d* as a function of temperature for a typical liquid-crystal. Converting this data to cell height or motor position would depend only upon mechanical features of the cell and motor drive. Alternatively, the optimum vertical positions can be experimentally determined as a function of temperature. In a yet further variation, logic could replace memory by curve fitting the temperature position relationship, similar to that of plot 62, to an equation.

An actuator 56, such as a stepper motor, can move the platform 30 supporting the wedge-shaped cell 10 up and down, for instance through a threaded motor shaft 58 engaging a nut-box 60 fixed to the platform 30. The control circuit 52 uses the detected temperature to access the look-up table 54 for a vertical position and issues forward and reverse rotation commands to the motor 56 to bring the vertical position of the platform 30 and hence that of the wedge-shaped cell 10 into conformance with the new desired position.

The approach of a look-up table is simple, but it requires calibration of the optimum vertical position across the entire range of expected temperatures and also requires that the temperature sensor 50 remains calibrated over time.

Figure 5:
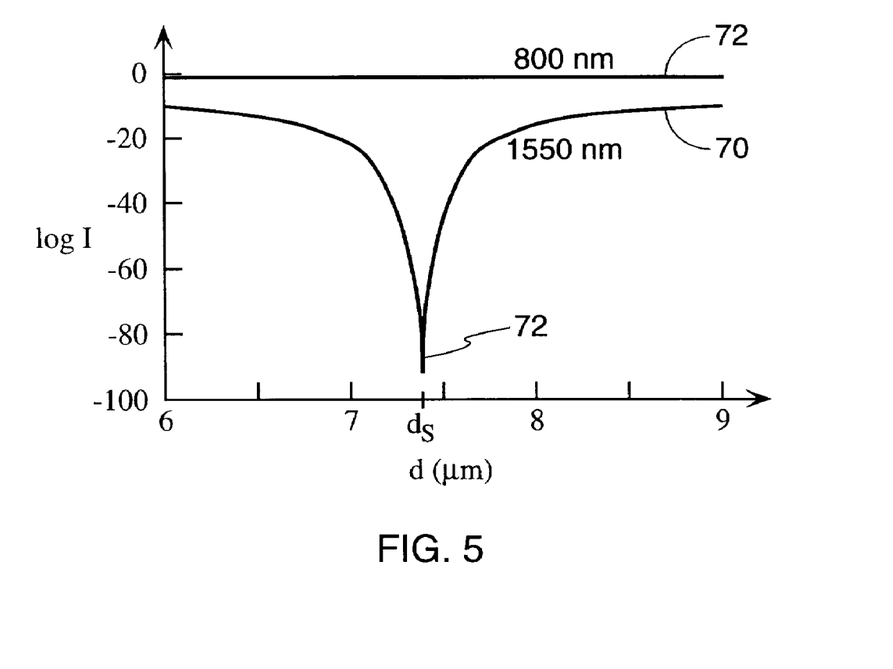
FIG. 5 is a semi-logarithmic graph of the transmitted optical intensities for both a data signal and a probe signal of differing wavelengths as they depend upon the gap size.

An alternative and preferred approach uses active control of the vertical position of the wedge-shaped cell through a feedback circuit, which is preferably servoed to an optical signal traversing the wedge-shaped cell 10. A particularly preferred approach is based upon the following observations. The extinction ratio or more precisely the parallel-polarizer transmissivity I for the 1550 nm data signal of interest is given by plot 70 in FIG. 5 as a function of the effective gap size d. As noted previously, such a plot 70 is valid only for a given temperature T. The transmissivity I exhibits a sharp minimum 72 around the thickness value $d_S$, which is the preferred operating point for the liquid-crystal cell 10 of FIG. 1. It is assumed, although it is not necessary, that this preferred operating point corresponds to the first minimum condition $u_1$ of Equation (2) such that $$d_S \cdot \Delta n_S(T) = u_1, \quad (5)$$

where $\Delta n_S(T)$ is the birefringence of the liquid crystal at the signal wavelength and at the operating temperature T. However, since $u_1$ is a fixed number, the preferred thickness value $d_S$ varies with temperature.

Plot 72 on FIG. 5 shows the transmissivity $I_P$ for a probe signal at a significantly different wavelength, here 800 nm, as a function of the same cell thickness d. The probe wavelength is chosen so that the probe signal is operating far away from any of the minimum conditions $u_i$ so that its transmissivity is only slightly below unity (below zero on a logarithmic scale). Nonetheless, the probe signal is operating on one of the tails of its transmissivity curve (it does not really matter which tail) when it traverses a cell with the optimum signal gap $d_S$ or even a gap of nearly the same size. A representation on a linear scale of the dependence of the probe transmissivity $I_P$ on the gap size d is shown by plot 74 in FIG. 6, which is equivalent to plot 72 of FIG. 5. This dependence is nearly but not quite linear. At the optimum signal gap size $d_S$, the probe transmissivity has a value $I_{P,S}$, here slightly above 0.4.

Figure 6:
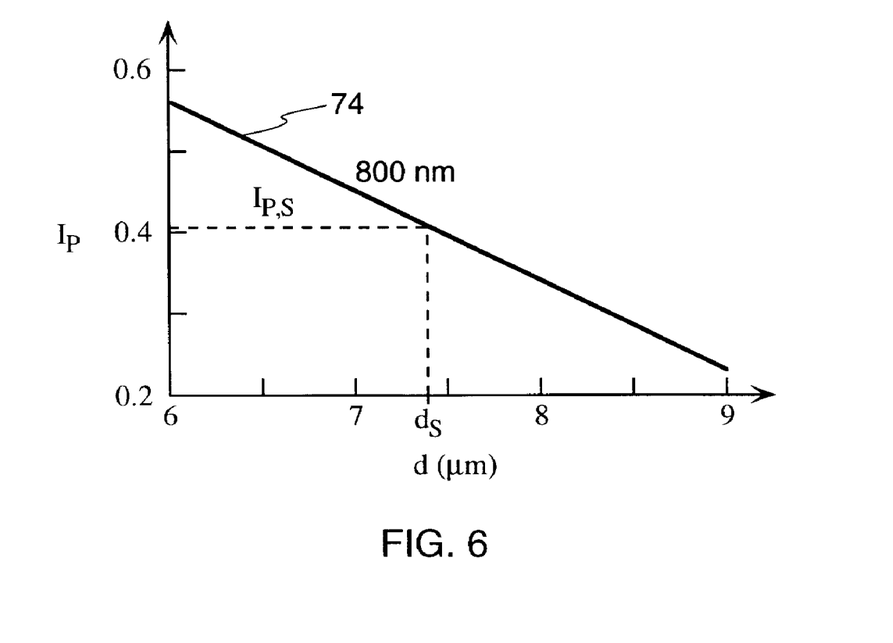
FIG. 6 is a linear graph of the transmitted intensity of the probe signal as function of the gap size.

According to this embodiment of the invention, the probe signal is monitored and the gap size $d_S$ is adjusted to keep the probe intensity at the value $I_{P,S}$. The probe intensity may be measured by the probe transmissivity $I_P$ or other proportional quantity, such as the detected probe intensity. If the detected probe intensity $I_P$ is too high, the gap size d should be increased; if is too low, the gap size d should be decreased. The amount of deviation is a measure of the amount of correction required.

Figure 7:
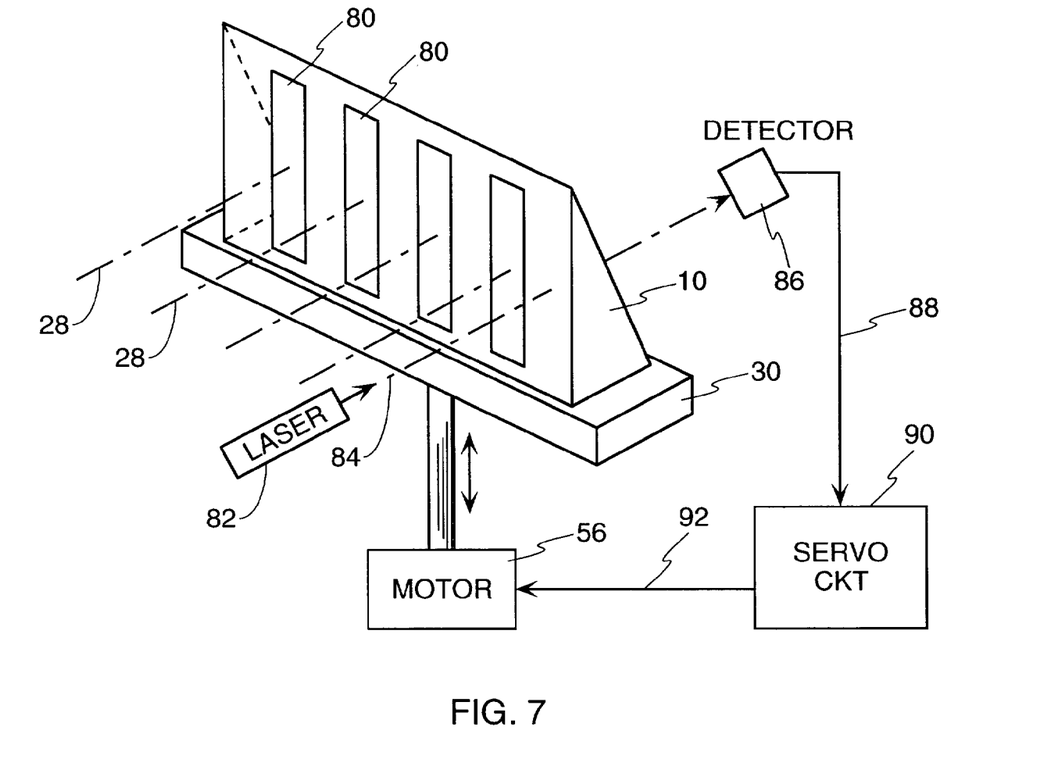
FIG. 7 is a schematic representation of a intensity-sensing embodiment of the temperature-compensating liquid-crystal system of the invention.

A schematic representation is shown in FIG. 7 of a feedback control system that relies upon sensing the intensity of light transmitted through the wedge-shaped cell 10, the taper of which is greatly exaggerated in the figure. The wedge-shaped liquid-crystal 10 includes multiple segmented electrodes 80 on one face and an unillustrated electrode on the opposing face to define segments of a multi-wavelength liquid-crystal cell. The segments receive respective optical data signals, here assumed to be in the neighborhood of 1550 nm, along respective beam paths 28. Four electrodes segments 80 and beam paths 28 are illustrated. However, the invention can be used with any number, from one up to a much larger number. Eight to twenty optical channels are being planned for WDM networks with which the invention can be advantageously used.

The electrodes 80 of the segments can be separately biased to selectively convert the polarization states of the respective optical data signals. Unillustrated polarizing elements on the input and output sides are generally required to provide switching or filtering of the optical signals according to the electrical bias applied across the respective liquid-crystal segments.

The wedge-shaped cell 10 is moved up or down along the wedge direction by the motor 56 and worm drive 58 engaging a worm box 60 or by other type of positional actuator so that the optical signals following the beam paths 28 strike the wedge-shaped cell at ar optimal position along the wedge, that is, the position having the optimal gap size $d_S$.

According to one embodiment of the invention, a light source such as a laser 82 outputs a probe beam 84 which strikes the wedge-shaped liquid-crystal cell 10 at a horizontal position away from the data beams 28 and the segmented electrodes 80 but at a vertical position relatively close to that of the data beams 28. The same polarization elements may be used for the probe beam 82 as for the data beams 28, but other polarization schemes may be employed. As a result, the probe beam 28 is not modulated but is exposed to the same state of the liquid crystal as an unbiased data beam 28. Typically, the unbiased state for a data signal is the one exhibiting a very high extinction ratio (low transmissivity) for the wavelength of the data signal.

Preferably, the wavelength of the probe signal from the laser 82 is significantly different from that of the data signals and does not exhibit absorption resonances at the same gap thickness d. Instead, the probe intensity varies smoothly with the gap size, as illustrated in FIG. 6, over the desired range of operation. An exemplary probe wavelength is around 800 nm, a wavelength region for which GaAs-based semiconductor lasers are available.

An optical detector 86 detects the intensity of the probe beam 84 traversing the liquid-crystal cell 10 and associated polarizers and provides an electrical signal over a detection line 88 to a servo control circuit 90. The electrical signal is generally proportional to the intensity of the transmitted probe signal, but strict linearity is not required. The servo control circuit 90 processes the probe intensity signal and issues an electrical correction signal over a correction line 92 to the motor 56 to move specified amount in a specified direction (up or down) so as to reduce and eventually zero out any difference between the detected intensity of the probe signal and the desired value. Because the control is included in a feedback loop, the correction does not need to be immediately accurate but may slowly approach the desired state.

Figure 8:
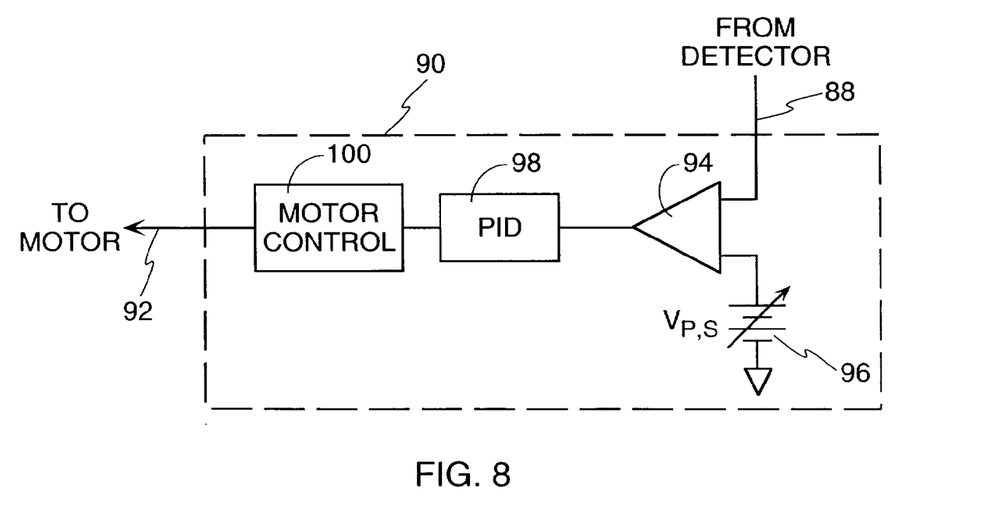
FIG. 8 is a circuit schematic of a servo control circuit usable in the embodiment of FIG. 7.

A simple example of the servo control circuit 90 is given in the circuit schematic of FIG. 8. The probe intensity signal is connected to one differential input of an analog comparator 94, such as a bipolar differential operational amplifier. The other differential input of the comparator 94 is connected to a reference voltage source 96 that has been set to a optimum value $V_{P,S}$, of the probe intensity signal.

The output of the comparator 94, which is proportional to the difference between its inputs, is input to a PID servo signal circuit 98. As is well known in servo circuitry, the PID circuit 98 takes a linear combination of the comparator output signal, its time integral and its time differential to produce a servo signal with quick response, but without excessive overshoot or the possibility of unstable oscillation. The servo signal, indicating both the direction and the amount of correction for the position of the wedge-shaped cell, is input to a motor controller 100 which converts the correction signals into a form appropriate for the motor 56 controlling the cell position. For example, if the motor 56 is a stepper motor, the motor controller 100 samples the analog servo signal at fixed periods, and converts it to a number of digital pulses (or motor steps) and a second digital signal indicating the direction of rotation for the motor.

If the correction signal issued to the motor 56 is insufficient to remove any difference between the probe intensity and the reference voltage $V_{P,S}$, the process continues until that difference is eliminated. If an external factor, such as a temperature change, causes the probe intensity to vary, the servo loop will immediately attempt to correct it.

In practice, the reference voltage source 96 is a variable voltage source which is calibrated by changing its voltage value until the optical performance of one or more of the data signals is optimized, for example, according to the characterizations described in the parent patent application.

In practice, also, it is not necessary to know the gap dependence of the probe signal intensity, a fully accurate version of which is given in FIG. 6. Indeed, the slope of the dependence 74 may be opposite to that illustrated. In the initial setup, if the servoed system will not converge, it may be assumed that the wrong sign of the slope was chosen. The slope is reversed by switching the inputs to the comparator 94 or by changing the sign of the terms in the PID servo circuit 98. The magnitude of the slope can be compensated by adjusting the gain of the comparator 94 or by changing the magnitude of the terms in the PID servo circuit 98.

Using the probe intensity to correct the temperature dependence of the data signal birefringence requires some explanation. The optimum probe intensity $I_{P,S}$ corresponds to a probe u-value $u_P$ given by $$d_S \cdot \Delta n_P(T) = u_P, \quad (6)$$

where $u_P$ does not correspond to one of the minimum conditions of Equation (4). Maintaining a constant value of the probe intensity $I_{P,S}$ is equivalent to maintaining the probe u-value at $u_P$. If the data and probe signals both have the same temperature dependence $$\frac{d_S}{\Delta n_S} \cdot \frac{\partial \Delta n_S}{\partial T} = \frac{d_P}{\Delta n_P} \cdot \frac{\partial \Delta n_P}{\partial T}, \quad (7)$$

then using the feedback to change d* in Equation (6) to keep $u_P$ constant in spite of a thermally changing probe birefringence $\Delta n_P$ will also keep $u_1$ in Equation (5) constant at the first minimum condition. Equation (7) has been generalized to allow $d_S$ to be different from $d_P$. That is, the probe and data signals may be aligned to strike at different vertical positions of the wedge. Any deviations between the birefringence thermal coefficients in Equation (7) will tend to pull the data signals somewhat off the minimum condition of maximum extinction coefficient at temperatures away from the calibration temperature, but the thermal compensation will be good to first order. A partial correction for non-equal birefringence thermal coefficients can be effected by vertically offsetting the data and probe beams 28, 84 so as to create a larger thermal effect in one or the other of the beams.

The translation of the liquid-crystal cell may be effected by any controllable means, whether electrical, mechanical, or a combination thereof. Likewise, the temperature of the liquid-crystal cell may be measured or monitored by any means known in the art.

The embodiments described above used translation of a wedge-shape liquid-crystal cell to effect the thermal compensation. Alternatively, optics controlling the vertical positions of the beams could be used to achieve the same relative movement to accomplish a change in the effective cell gap across which the data beam propagates.

Figure 9:
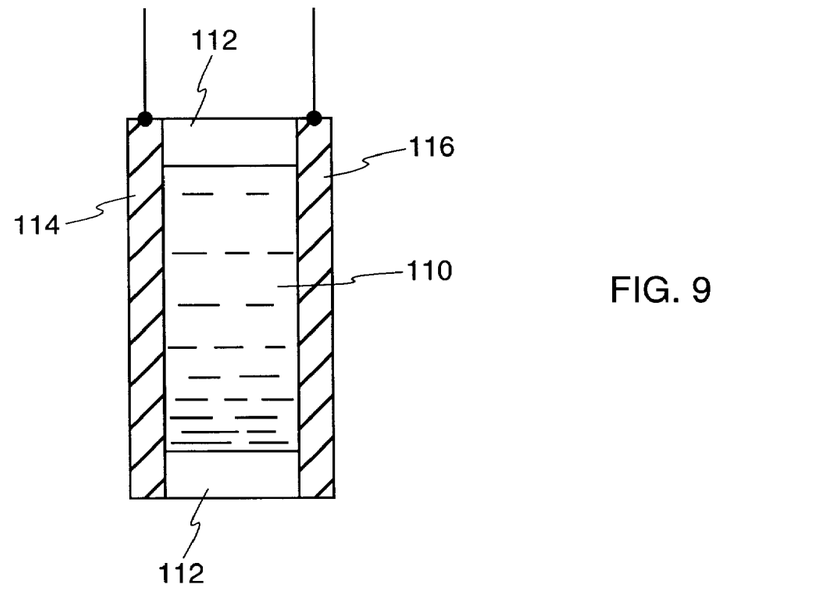
FIG. 9 is a schematic cross-sectional view of a liquid-crystal cell whose gap is piezoelectrically varied.

Alternatively, the effective gap size can be changed in a number of different ways. In a first alternative approach for varying the gap, as illustrated in cross section in FIG. 9, the gap of a liquid-crystal cell 110 is determined by one or more spacers 112 composed of a piezoelectric material, such as lead zirconate titanate (PZT). Two electrodes 114, 116 sandwich the piezoelectric spacers 112 so that a selected voltage applied across the electrodes 114, 116 causes the piezoelectric spacers 112 to be elastically compressed or extended depending upon the in the direction of the applied field relative to the polarization direction of the materials polarization direction. The magnitude of the mechanical deformation is generally proportional to the magnitude of the applied voltage. Thereby, the gap size of the liquid-crystal cell can be electrically controlled. The gap-varying electrodes may assume several forms. The planar liquid-crystal electrode may be used as one of the gap-varying electrode. Another gap-varying electrode is patterned over the piezoelectric spacers 110 and in areas removed from the segmented liquid-crystal electrodes. Although the illustrated liquid-crystal cell is planar, the same concept can be applied to a wedge-shaped cell.

Figure 10:
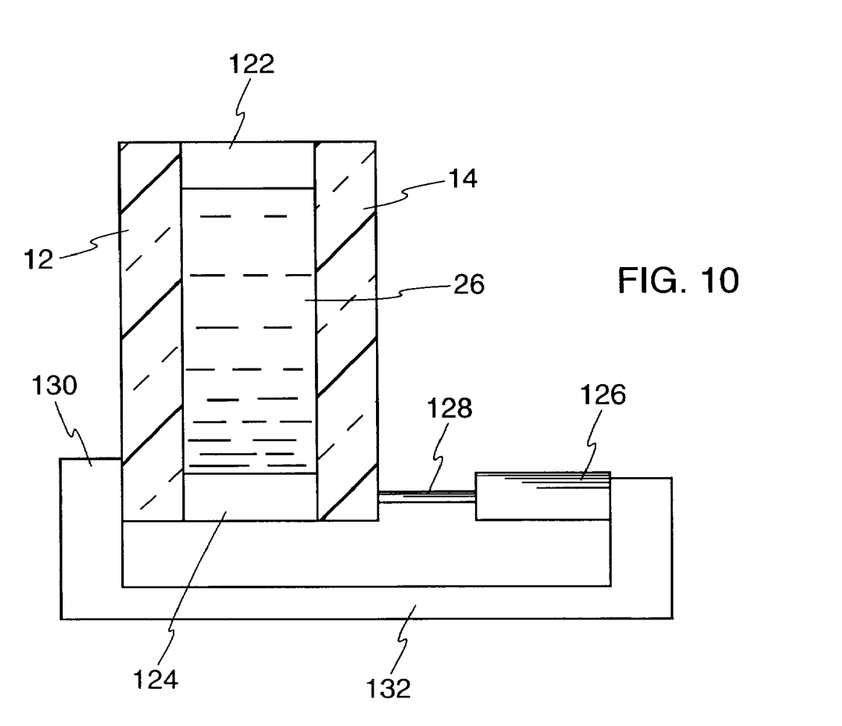
FIG. 10 is a schematic view, partially in cross section, of a liquid-crystal cell whose gap is varied by the application of mechanical force.

In a yet further approach for varying the gap size, as illustrated in FIG. 10, the glass plates 12, 14 providing the principal mechanical strength of the cell are separated by sets of spacers 120, 122 on the top and bottom of the cell. The liquid crystal 26 is filled into the gap between the glass plates 12, 14. The liquid-crystal electrodes and the alignment layers between the glass plates 12, 14 and the liquid crystal 26 are not illustrated here. At least the spacers 124 on one side of the cell are elastic. An actuator 126, for example a pneumatic cylinder applies a controlled force or displacement to an actuating rod 128 pressed against one glass plate 14 in the area of the elastic spacers 124. The corresponding area of the other glass plate 12 butts up to a wall 130 of a support 124 to which the actuator 126 is fixed. Selective application of force by the actuator 126 will cause the elastic spacers to compress, thereby reducing the size of the cell gap. If such force is applied to all the elastic spacers 124, 126, then the gap is uniformly reduced. If the force is applied to only one set of spacers 124, as illustrated, then a selectively tapered wedge is formed with the effective gap at the midpoint being reduced by one-half the reduction of the spacers 124. For multiple optical beams 28, the beams need to be lined up in the direction perpendicular to the wedge direction for them to experience a uniform variation in gap size.

Yet another embodiment of an adjustable gap in a liquid-crystal cell relies upon a micro electro mechanical system (MEMS). This recently developed technology uses the fabrication techniques of silicon integrated circuits to build miniature mechnical system. As illustrated in cross section in FIG. 11 and in plan view in FIG. 12, the top surfaces of two silicon wafers 140, 142 are coated with respective layers 146, 148 of silicon oxynitride ($SiO_xN_y$) to thicknesses of the order of micrometers. The exact thicknesses are chosen so that at least one of the layers 146, 148 is deformable, as will be described later. A series of electrodes are deposited and defined over the silicon oxynitride layers 146. These include segmented liquid-crystal electrodes 150, a matching planar liquid-crystal electrode 152, and two opposed deformation electrodes 154, 156. Matching apertures of size of about 100 μm×100 μm are etched from the bottom surface of the silicon wafers 142, 144 in the areas of the electrodes 150, 152, 154, 156 all the way to the silicon oxynitride layers 146, 148. The two wafers 142, 144 are bonded together to form a cavity 158 that is filled with a liquid crystal.

Figure 11:
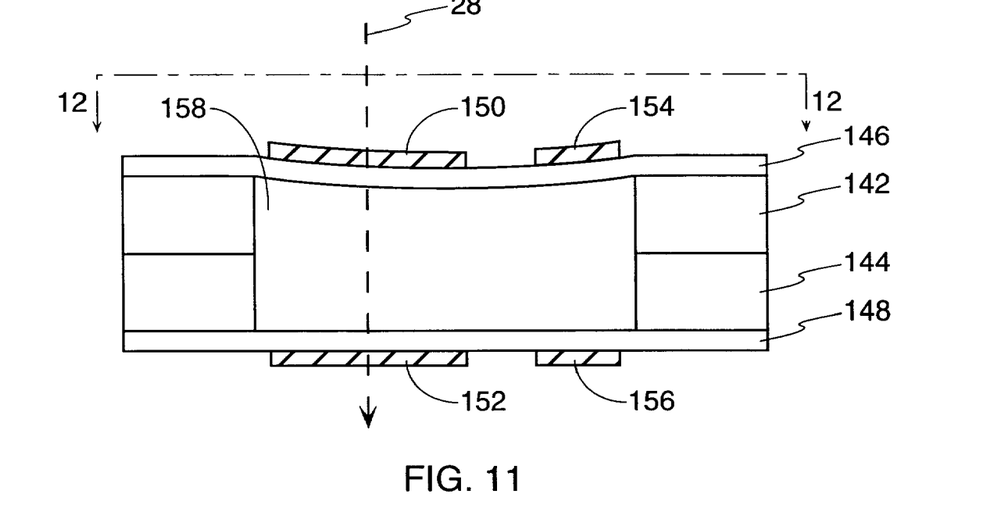
FIG. 11 is a cross-sectional view of a micromechanical embodiment of an adjustable liquid-crystal cell of the invention.
Figure 12:
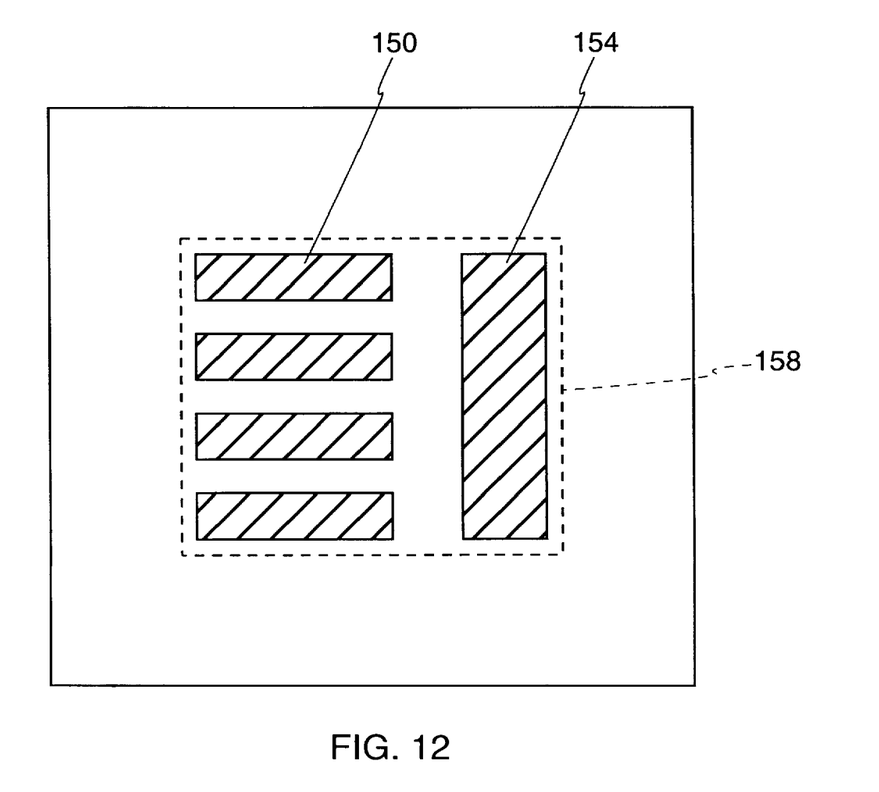
FIG. 12 is a plan view of the micromechnical embodiment of FIG. 11 taken along the view line 12—12.

Multiple light beams 28 are aligned with the segmented liquid-crystal electrodes 150, and the data voltages applied between those respective electrodes 150 and the planar counter electrode 152 determines the polarization states of the segments. A higher deformation voltage applied between the deformation electrodes 154, 156 produces an electrostatic attraction between the deformation electrodes 154, 156 that deforms the upper membrane 146 in the area of the cavity 158. The value of the deformation voltage determines the amount of deformation of the membrane 146 and hence the effective thickness of the liquid-crystal gap in the area of the data beams 28. This embodiment does not require a lateral movement of the cell.

A multi-wavelength liquid-crystal switch is a complex system with many important performance characteristics when used in an extended communication network. The description above assumed a well defined optimum thickness for the wedge-shaped cell while, in fact, trade offs may be required between different characteristics such as cross-talk and insertion loss in order to optimize the overall system performance. For these reasons, it may be desirable to incorporate an optical performance monitor 160, as illustrated in the schematic block diagram of FIG. 13, to monitor the optical performance of the optical signals being switched. Optical signals are input to the switching system on two optical input paths 162, such as optical fibers. Optical couplers 164 are disposed on the optical paths 162 prior to optics 166, such as wavelength-dispersive elements and lenses, distributing the optical input signals to the wedge-shaped liquid-crystal cell 10. The optical couplers 164 tap a small fraction of the optical input signals to a 1×4 optical time multiplexer 168. Similarly, output optical couplers 170 are disposed on output optical paths 172 on the output side of switch output optics 174 to tap a portion of the optical output signals to the time multiplexer 168. The 1×4 time multiplexer 168 sequentially couples each of its four inputs to the performance monitor 160.

The performance monitor 160, which includes additionally optics, measures the intensities and the wavelengths of the four multi-wavelength signals as well as noise levels. The controller 52 thus is informed of the signal-to-noise levels of the optical signals and can derive values of cross talk. Sufficient intelligence is incorporated into the controller 52 to trade off the thermal signal provided by the thermocouple 50 with the optical performance of the switch to allow an optimized correction signal for the motor 56. Of course, the thermal monitoring signal may be provided by the out-of-band extinction coefficient, as in FIG. 7, or by other means, and the liquid-crystal gap size may be adjusted by other means than the motor, for example, as shown in FIGS. 8 through 12.

Figure 13:
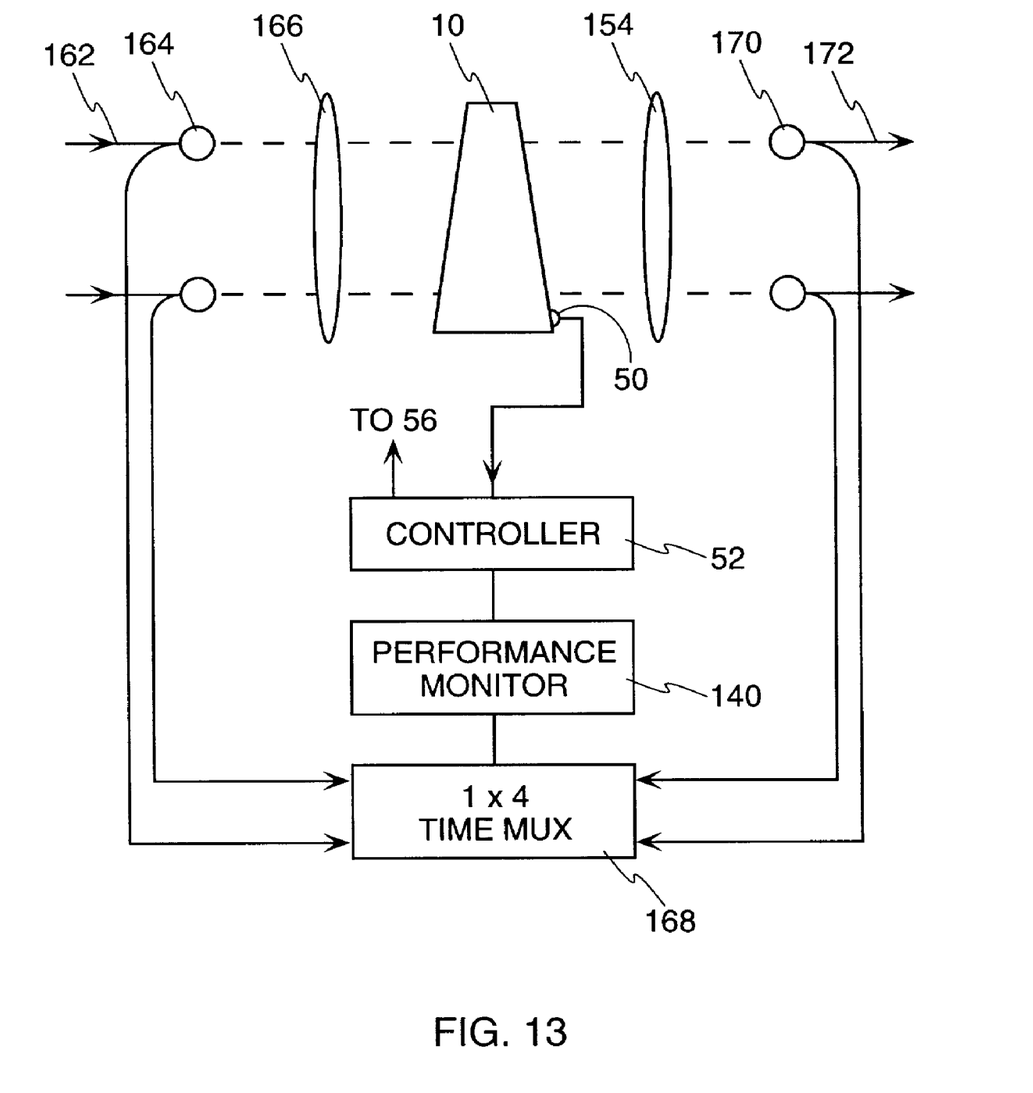
FIG. 13 is a schematic block diagram of a variation of the control system of the invention incorporating an optical performance monitor.

The performance monitor 140 is also useful for compensating for thermal effects in the switching system other than the thermal coefficient of the liquid crystal. If the optics 146, 150 are affected by temperature, an additional motorized stage can be included to selectively translate the liquid-crystal cell 10 in a direction along which the liquid-crystal segments 80 are arranged so as to align the passbands of the wedge-shaped cell with the multi-wavelength bands.

The invention thus provides the thermal compensation required of a high-performance liquid-crystal modulator or switch without the necessity of maintaining the temperature within a narrow range. Particularly the embodiment involving the translation of the wedge-shaped cell involves inexpensive, straightforward technology.

Although thermal compensation is the most useful application of the invention, the same inventive features can be applied to compensating for other temporally varying effects, for example, humidity or drifting optical carrier wavelengths, which may affect the optical characteristics of the liquid crystal or the mechanical structure defining and supporting the cell and directly or indirectly affecting its optical characteristics.

What is claimed is:

1. A temperature-compensated liquid-crystal system, comprising:

a liquid-crystal cell comprising a cavity filled with a liquid crystal and having a gap size across which a data light beam propagates;

means for measuring an operational temperature of said liquid-crystal cell; and means responsive to said measuring means for adjusting said gap size at said operational temperature.

2. The liquid-crystal system of claim 1, wherein said measuring means comprises a thermometric device.

3. The liquid-crystal system of claim 1, wherein said measuring means comprises:

a source of a probe light beam having a wavelength different than that of said data light beam; and an optical detector of an intensity of said probe light beam propagating through said liquid-crystal cell.

4. The liquid-crystal system of claim 1, wherein said cavity of said liquid-crystal cell is wedge-shaped and said adjusting means includes mechanical moving means for moving at least one of said liquid-crystal cell and said data light beam along a wedge direction of said wedge-shaped cell.

5. The liquid-crystal system of claim 1, wherein said adjusting means deforms said cavity to adjust said gap size.

6. A temperature-compensated liquid-crystal system, comprising:

a liquid-crystal cell comprising a wedge-shaped cavity having a gap varying along a wedge direction;

a controller measuring a temperature of said liquid-crystal cell; and an actuator controlled by said controller and moving said liquid-crystal cell along said wedge direction.

7. The liquid-crystal cell of claim 6, further comprising a thermometric device associated with said liquid-crystal cell for measuring said temperature of said liquid-crystal cell and providing an output to said controller.

8. The liquid-crystal cell of claim 6, further comprising an optical system measuring a temperature dependent characteristic of said liquid-crystal cell and proving an output signal to said controller.

9. A compensated liquid-crystal system, comprising:

a liquid-crystal cell having a cavity of width varying along a first direction and filled with a liquid crystal, said cell being adapted to be irradiated with a first beam of light having a first wavelength, an electrical bias applied across electrodes disposed on opposite sides of said cavity causing a substantial change in a polarization state of light having said first wavelength;

a source of a second beam of light having a second wavelength substantially different from said first wavelength and irradiating said liquid-crystal cell;

a detector of said second beam; and a feedback circuit responsive to an output of said detector and causing said first liquid-crystal cell to move relative to said first beam along said first direction.

10. The liquid-crystal system of claim 9, wherein said feedback circuit causes said output of said detector to converge to a predetermined value.

11. The liquid-crystal system of claim 9, further comprising an actuator controlled by said feedback circuit and selectively moving said liquid-crystal cell along said first direction.

12. A method of compensating temperature in a liquid-crystal cell that has a liquid-crystal filled gap thickness varying along a first direction, comprising moving said liquid-crystal cell along said first direction in response to a change in a temperature of said liquid-crystal cell.

13. The method of claim 12, further comprising measuring said temperature of said liquid-crystal cell.

14. The method of claim 12, further comprising optically measuring a temperature dependent optical characteristic of said liquid-crystal cell and performing said moving in accordance with said measured characteristic.

* * * * *